July 2, 1929.  P. NICHTERLEIN  1,719,443

REVERSING PRISM AFFORDING PARALLEL VISION

Filed June 18, 1926

Inventor:
Paul Nichterlein

Patented July 2, 1929.

1,719,443

UNITED STATES PATENT OFFICE.

PAUL NICHTERLEIN, OF JENA, GERMANY, ASSIGNOR TO THE FIRM: CARL ZEISS, OF JENA, GERMANY.

REVERSING PRISM AFFORDING PARALLEL VISION.

Application filed June 18, 1926, Serial No. 116,961, and in Germany June 24, 1925.

In reversing prisms, which afford parallel vision and in which five reflections on the outer surfaces of the prism take place in one and the same plane, one attains, as is well known, a complete reversion of the image by constructing one of the reflecting surfaces as a roof surface. In the prisms of this kind already known in which, in addition, one of the reflecting surfaces simultaneously serves as a ray-traversing surface, one chooses as a roof surface that reflecting surface which is first struck by a ray having entered the prism through the said traversing surface. Conversely, however, according to the present invention at least one reflection takes place on one of the other reflecting surfaces before the roof surface is struck. This affords particularly the following advantage. In practice when constructing such prisms it is usually not possible to make the prism consist of a single piece of glass but, on the contrary, for reasons of working it is necessary to make up the prism, since it will have a re-entering angle, of two parts which are eventually cemented together in order to prevent loss of light. Whilst in the prisms hitherto known, owing to the position chosen for the roof surface, it was necessary to effect the cementing of two surfaces, of which one, because it is struck by the roof surface, only affords a reduced magnitude for the cementing, this has been avoided in the new prism.

A particularly compact construction with a comparatively large displacement of the exit axis relatively to the entrance axis is attained by constructing that surface as a roof surface which is finally struck prior to the said traversing surface by the ray entered.

In the annexed drawing the invention is explained by three examples.

Figures 1, 2:
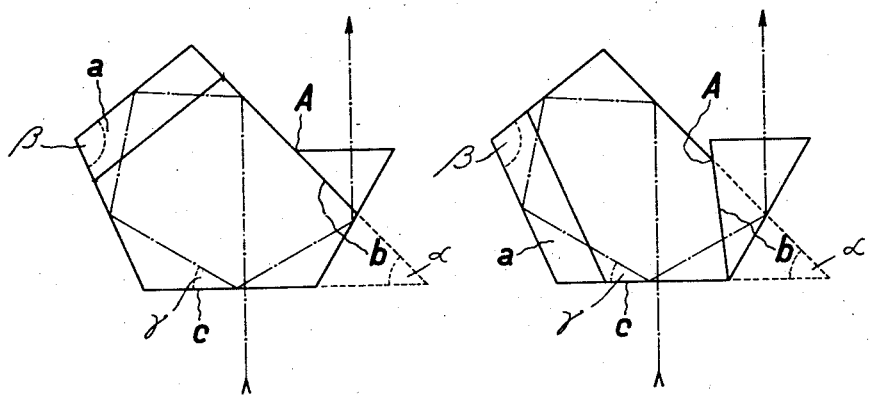

In the example according to Fig. 1 the prism consists of two parts cemented together. The roof surface $a$ is the second reflecting surface. On the cemented surface $b$ which, as required, starts from the vertex $A$ of the re-entering angle, there are adjacent to each other parts contiguous to one another with their full surface. The reflecting surface, simultaneously used as a traversing surface, is denoted by $c$.

In the example according to Fig. 2 the prism also consists of two parts cemented together. The roof surface $a$ is the third reflecting surface. Also in this case on the cemented surface there are adjacent to each other parts contiguous to one another with their full surface. The reflecting surface, simultaneously used as a traversing surface, is again denoted by $c$.

Figure 3:
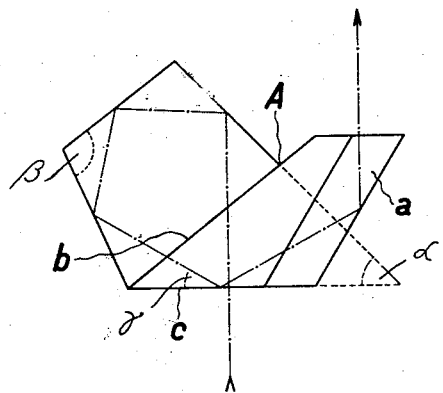

In the example according to Fig. 3 the prism also consists of two parts cemented together. The roof surface $a$ is the last reflecting surface. Also in this case on the cemented surface there are adjacent to each other parts contiguous to one another with their full surface. The reflecting surface, simultaneously used as a traversing surface, is again denoted by $c$.

With each example there is denoted by $\alpha$ the angle formed by surface $c$ with the surface, which is first struck by a ray entering the prism through the the surface $c$, and by $\beta$ the angle formed by the two surfaces struck by the said ray before the same again strikes the surface $c$. By $\gamma$ is denoted the angle at which is inclined the said ray when it again strikes the surface $c$. For enabling the surface $c$ to be used as a ray-traversing surface and simultaneously as a reflecting surface, the angle $\gamma$ must be so small that the said ray is totally reflected on this surface, so that no silvering of the latter is necessary. Hence, when $n$ denotes the reflective index of the prism, there must be $$\cos \gamma > \frac{1}{n}.$$

As may be readily deduced from the drawing, between the angles $\alpha$, $\beta$ and $\gamma$ there holds good the equation $$\gamma = 2(\alpha+\beta) + 90°.$$

By combining this equation with the relation stated before, there results that the relation $$-\sin 2(\alpha+\beta) > \frac{1}{n}$$

must be fulfilled if total reflection shall take place at the surface $c$.

I claim:

1. Reversing prism consisting of two parts cemented to each other, the prism having six operative surfaces, of which one is adapted to be used as a ray-traversing surface, another, being parallel to the former, is destined to be used both as a ray-traversing and a reflecting surface, a third surface is a roof surface and the other three operative surfaces are simple reflecting surfaces, the three operative surfaces, struck before that second ray-traversing surface is again struck by a ray entering the prism through this surface, being so located that between the angle $\alpha$ formed by this surface with that of these three surfaces which is first struck, the angle $\beta$ formed by the other two of these surfaces, and the refractive index $n$ of the prism there exists the relation $$-\sin 2(\alpha+\beta) > \frac{1}{n},$$

the said roof surface being not the first reflecting surface struck by the said ray.

2. Reversing prism consisting of two parts cemented to each other, the prism having six operative surfaces, of which one is adapted to be used as a ray-traversing surface, another, being parallel to the former, is destined to be used both as a ray-traversing and a reflecting surface, a third surface is a roof surface and the other three operative surfaces are simple reflecting surfaces, the three operative surfaces, struck before said second ray-traversing surface is again struck by a ray entering the prism through this surface, being so located that between the angle $\alpha$ formed by this surface with that of these three surfaces which is first struck, the angle $\beta$ formed by the other two of these surfaces, and the refractive index $n$ of the prism there exists the relation $$-\sin 2(\alpha+\beta) > \frac{1}{n},$$

the said roof surface being the last reflecting surface struck by the said ray.

PAUL NICHTERLEIN.